UNITED STATES PATENT OFFICE.

WILLIAM COX, OF DAYTON, OHIO.

IMPROVEMENT IN THE COMPOSITION OF MATTER TO BE USED AS PAINT FOR HOUSES, &c.

Specification forming part of Letters Patent No. 438, dated October 23, 1837.

*To all whom it may concern:*

Be it known that I, WILLIAM COX, of Dayton, Montgomery county, Ohio, have discovered a new Paint for Painting Brick and other Houses; and I do hereby certify that the following is a full and exact description for preparing it.

The nature of my discovery consists in the proper mixing of the following ingredients and in the following proportions for making one barrel containing thirty-three gallons of paint: Take one bushel of unslaked lime, one and one-half gallon strong vinegar, five pounds alum, two pounds pearlash, five quarts common salt, one-half pound saltpeter, one-half pound borax. Mix them in twenty-six gallons hot water, and when dissolved is ready for use.

What I claim as my discovery, and desire to secure by Letters Patent, is—

The combination of the above ingredients as a durable paint for houses, particularly brick houses, which can be made of any color by adding to the before-described mixture one pound of red lead to the gallon of water, Spanish brown, yellow ocher, lamp-black, chrome-yellow, or Venetian red, to make any color desired.

WILLIAM × COX.
his mark

Witnesses:
W. P. HUFFMAN,
SAMUEL NEWTON.